United States Patent [19]
Doctor

[11] Patent Number: 5,477,052
[45] Date of Patent: Dec. 19, 1995

[54] EARTH SENSOR FOR SATELLITES WITH RADIANCE COMPENSATION

[75] Inventor: Alan P. Doctor, Sea Cliff, N.Y.

[73] Assignee: Servo Corporation of America, Hicksville, N.Y.

[21] Appl. No.: 229,460

[22] Filed: Apr. 18, 1994

[51] Int. Cl.[6] ....................................... G01J 5/06
[52] U.S. Cl. ...................... 250/349; 250/342; 244/171
[58] Field of Search ................................. 250/349, 347, 250/338.1, 342, 372; 244/171

[56] References Cited

U.S. PATENT DOCUMENTS

| | | | |
|---|---|---|---|
| 3,304,425 | 2/1967 | Astheimer | 250/349 |
| 4,048,500 | 9/1977 | Moore | 250/351 |
| 5,055,689 | 10/1991 | Proffit et al. | 250/349 |

*Primary Examiner*—Carolyn E. Fields
*Attorney, Agent, or Firm*—Kane, Dalsimer, Sullivan, Kurucz, Levy, Eisele and Richard

[57] ABSTRACT

The attitude of a satellite is determined by using an array of IR detectors receiving an image of space and the Earth. The detectors are positioned so that at least one detector monitors the radiance from the Earth's horizon and a second detector monitors a region of the Earth adjacent to said horizon. The output of the first detector is compensated for variations in the radiance of the Earth by using the output of the second detector.

12 Claims, 2 Drawing Sheets

EARTH SENSOR FOR SATELLITES WITH RADIANCE COMPENSATION

BACKGROUND OF THE INVENTION

1. Field of Invention

This invention pertains to a sensor for the detecting the Earth from a satellite, and more particularly to a system for detecting the horizon of the Earth to determine the satellite's attitude.

2. Description of the Prior Art

As a satellite is orbiting the Earth, its attitude must be checked periodically to determine the pitch and roll of the satellite. This task is normally accomplished using Earth sensor systems having IR detectors which monitor the surface of the Earth and determine the position of its horizon by comparing the radiant contrast between the Earth and space. However present systems are very susceptible to errors when the Earth's surface presents variations in reflectivity or radiance caused by seasonal or geographic effects. There are several prior schemes used to compensate for this variation however, all of these schemes either require that the radiance variation be known or use a variable threshold scheme.

OBJECTIVES AND SUMMARY OF THE INVENTION

It is an objective of the present invention to provide an improved sensor system which is capable of proper operation even with variations in the Earth's radiance.

Briefly, an Earth sensor system constructed in accordance with this invention includes a plurality of detectors arranged in an array and positioned to receive an image of the Earth's horizon as a reference element. The detectors generate signals which are analyzed to determine the relative position of the image reference on the array from which the satellite attitude can be determined and corrected variations in the Earth's radiance are compensated by using the signal from one of the detectors which monitors a region adjacent to the horizon.

DETAILED DESCRIPTION OF THE INVENTION

Figure 1:
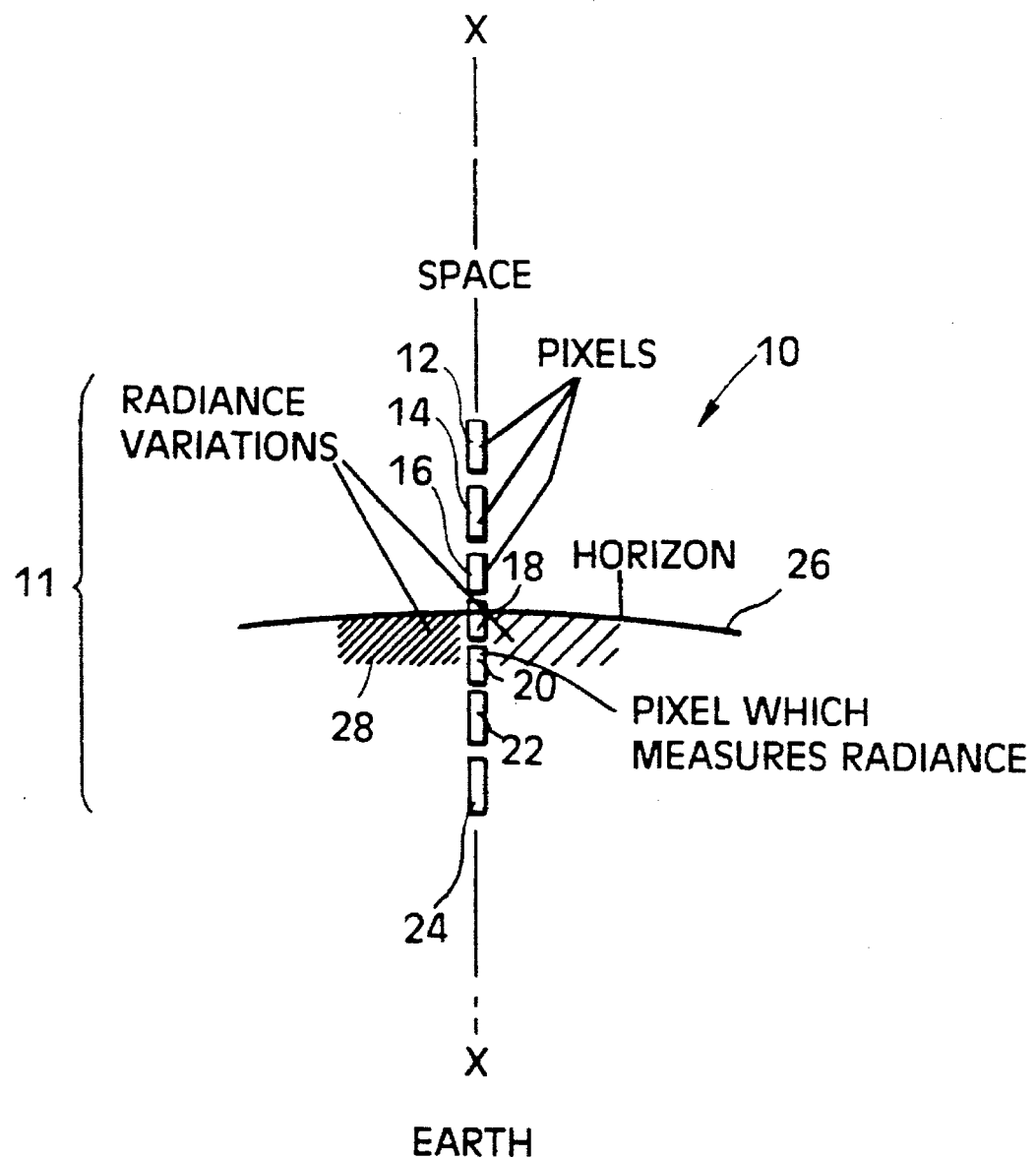
FIG. 1 shows a somewhat schematic image of the Earth's horizon as perceived by an array of IR detectors.

Referring now to FIG. 1, the subject Earth sensor system 10 includes a plurality of IR detectors arranged in an array 11. While other arrangements may be used, in FIG. 1 the detector array 11 includes a row of seven detectors 12–24. Under nominal conditions, the detectors are positioned such that an image of the Earth falls on detectors 20, 22, 24 while detectors 12, 14 and 16 perceive an image of open space. The central detector 18 perceives an image of the boundary of the Earth and space, i.e., horizon 26. Importantly, the region of Earth 28 just below the horizon 26 has substantially the same radiance as the Earth right at the horizon 26. This region 28 is perceived or monitored by detector 20 and its output is used to offset the measurements from detector 18. Accordingly any variations of radiance are effectively compensated.

When the satellite is in a normal or preselected attitude, the image of the Earth projected on the array 11 falls such that the Earth's horizon 26 is substantially tangential to the X—X axis of detector array 11. Preferably the detector array 11 is made up of IR detectors and detectors 20, 22, 24 generate signals indicative of the temperature of the Earth, detectors 12, 14, and 16 generate signals indicative of the temperature of deep space and detectors 18 generates signals indicative of an intermediate temperature indicative of the horizon 26. As mentioned above, erroneous results occurred in prior art systems when the Earth had variations in reflectivity or radiance. To compensate for this variation the signal processing circuitry shown in FIG. 2 may be used as follows.

Figure 2:
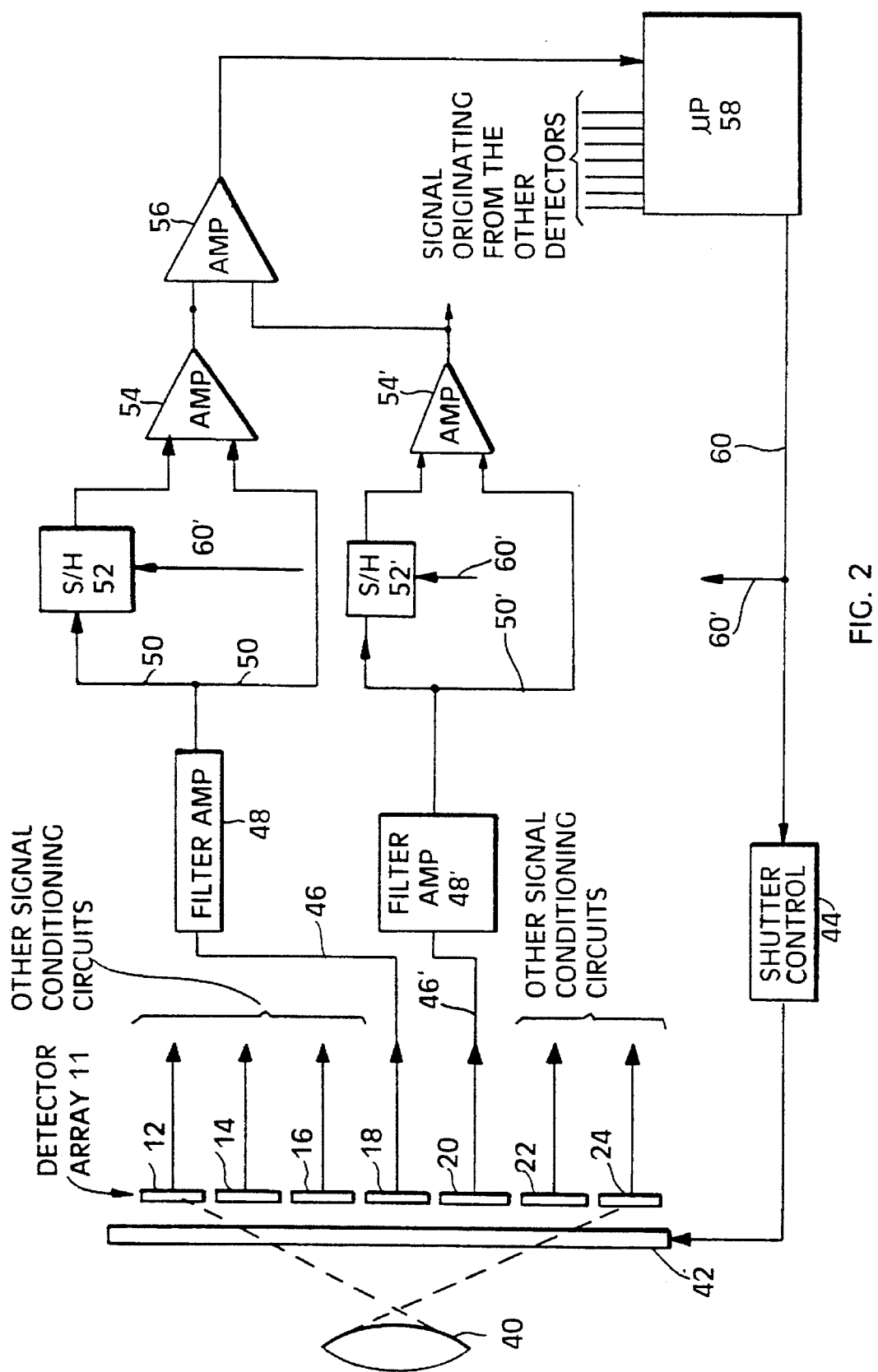
FIG. 2 shows a block diagram of the sensor system incorporating the detectors of FIG. 1 and constructed in accordance with this invention.

As seen in this Figure, the array of detectors 11 and a lens 40 are positioned so that an image of the Earth and its horizon is projected by lens 40 on the array 11 as discussed above. A shutter 42 is positioned either in front of the lens 40, or as shown in FIG. 2 between the lens 40 and array 11. The shutter 42 is controlled by a shutter control circuit 44 to selectively block the image of the Earth and space from the array 11.

Detector 18 detects the incident IR radiation and generates a corresponding electrical signal on line 46. This signal is conditioned by a signal conditioning circuit 48, which may include filtering and amplification means. The conditioned signal is fed on lines 50 to a sample-and-hold circuit 52 and a differential amplifier 54. Amplifier 54 also receives an input from the sample-and-hold circuit 52. The output of amplifier 54 is fed to a second amplifier 56. Amplifier 56 receives a second input from amplifier 54' as discussed below.

Similarly detector 20 detects incident IR radiation and generates a corresponding signal on line 46'. This signal is processed in a manner identical to the signal on line 46 by filtering and amplification means 48', sample-and-hold circuit 52' and amplifier 54'.

The output of amplifiers 54, 54' are fed to a microprocessor 58. The microprocessor 58 receives similar signals from other signal processing circuits substantially identical to the ones just described, said signals originating from the other detectors 12, 14, 16, 22, 24 of the array 11. The microprocessor 58 generates control signals on lines 60 and 60' to the shutter control 44 and sample-and-hold circuits 52, 52'. It should be understood that all or most of the circuitry shown in FIG. 2 may be incorporated into the microprocessor 58 and is shown as having discrete components for the sake of clarity. It should be also understood that A/D conversion means well known in the art may be used for converting the signals from the detectors of the array 11 but has been again omitted for the sake of clarity.

The sensor system operates as follows, assuming that the horizon 26 falls on detector 18 as shown in FIG. 1. Initially the shutter 42 is in place in front of the detector array 11. Each detector of the array 11 then generates a signal indicative of the temperature of the shutter 42. The signals from detectors 18 and 20, after conditioning, are stored in the sample-and-hold circuits 52 and 52' as a reference signals at the direction of the microprocessor 58 on lines 60'. The signals from the remaining detectors of array 11 are similarly stored in other sample-and-hold circuits not shown. The shutter 42 is next removed by the shutter control circuit 44 and an image of the Earth and space is projected on array 11 by lens 40 as shown in FIG. 1. In response, detector 18 generates a signal which (after conditioning) is fed to amplifier 54. An output signal corresponding to the difference between the detected and the reference signal from the sample-and-hold circuit 52 is generated by amplifier 54. This difference output signal is fed to amplifier 56. A similar signal is obtained from amplifier 54' and fed as a second input to amplifier 56. As previously discussed, the detector 20 monitors region 28 disposed close to the horizon and therefore any variations in reflectivity or radiance of the Earth is the same at the horizon as in region 28. Therefore amplifier 56 normalizes or offsets the difference output signal from amplifier 54 to compensate for this variation of radiance. This may be accomplished for example by subtracting all or a portion of the output of amplifier 54' from the output of amplifier 54. The normalized signal generated by amplifier 56 is then fed to the microprocessor 58. The microprocessor uses the inputs received from various detectors to determine the angular position of the satellite in a manner known in the art.

Obviously numerous modifications may be made to this invention without departing from its scope as defined in the appended claims.

I claim:

1. A sensor system for determining the attitude of a satellite comprising:

an array of detectors, each detector generating a signal indicative of incident radiation;

projecting means for projecting an image on said array, including an image of the Earth's horizon;

signal processing means for processing said signals to determine the location of the Earth's horizon with respect to said detectors; and means for normalizing the signal of at least one of said detectors by using a signal from a second of said detectors to compensate for variations in the radiance of the Earth, said at least one detector being directed at the Earth's horizon and said second detector being adjacent to said at least one detector and directed to receive radiance from the Earth adjacent to the horizon.

2. The system of claim 1 further comprising shutter means for selectively blocking said projecting means, said detectors generating blocked signals when said projecting means is blocked and unblocked signals when said projecting means is unblocked by said shutter means.

3. The system of claim 2 further comprising signal storage means for storing signals when said detectors are blocked to establish reference signals.

4. The system of claim 3 further comprising amplifier means for amplifying a difference of said blocked and unblocked signals.

5. An Earth sensor system to determine the attitude of a satellite from the Earth's horizon, said system comprising:

an array of detectors arranged to receive an image of the Earth's horizon, said detectors generating signals indicative of the incident radiation, said array including at least a first detector and a second detector adjacent to said first detector, said first detector generating a first output signal corresponding to radiation incident on said first detector from the Earth's horizon, and said second detector generating a second output signal corresponding to radiation incident on said second detector from the Earth adjacent to the horizon; and compensating means for compensating said first output signal for variations in the Earth's radiance by using said second output signal.

6. The system of claim 5 wherein said detectors are IR detectors.

7. The system of claim 5 further comprising projecting means for projecting said image on said array.

8. The system of claim 7 wherein said projecting means includes shutter means for selectively blocking said image from said array.

9. The system of claim 8 further comprising a multiplying means for generating a difference original from said detectors when said array is blocked and unblocked.

10. The system of claim 9 further comprising signal processing means for processing said signals.

11. The system of claim 10 wherein said signal processing means includes a microprocessor.

12. The system of claim 11 wherein said shutter means is controlled by said microprocessor.

\* \* \* \* \*